United States Patent [19]

Manning et al.

[11] Patent Number: 4,685,858

[45] Date of Patent: Aug. 11, 1987

[54] VEHICLE ENTRANCE RAMP

[75] Inventors: Donald L. Manning, Orchard Lake, Mich.; Delos W. Hood, Reno, Nev.

[73] Assignee: Transpec Inc., Troy, Mich.

[21] Appl. No.: 831,305

[22] Filed: Feb. 20, 1986

[51] Int. Cl.⁴ ............................................. B65G 67/02
[52] U.S. Cl. ................................ 414/537; 280/166; 414/522; 414/921
[58] Field of Search ............... 414/522, 537, 541, 549, 414/558, 749, 921; 280/166; 105/445, 449

[56] References Cited

U.S. PATENT DOCUMENTS

| | | | |
|---|---|---|---|
| 2,573,496 | 10/1951 | Runkle | 414/522 |
| 2,797,104 | 6/1957 | Drobney et al. | 280/166 |
| 4,058,228 | 11/1977 | Hall | 414/549 |
| 4,131,209 | 12/1978 | Manning | 414/537 |
| 4,133,437 | 1/1979 | Gates | 414/921 X |
| 4,140,230 | 2/1979 | Pearson | 414/558 X |
| 4,306,634 | 12/1981 | Sangster | 414/921 X |
| 4,564,086 | 1/1986 | Kingston | 414/921 X |

*Primary Examiner*—L. J. Paperner
*Assistant Examiner*—David A. Bucci

[57] ABSTRACT

The present invention relates to an extendible and retractable ramp device for a vehicle particularly concerned with the loading and unloading of handicapped person and which device particularly includes a power actuating mechanism disposed within the vehicle in such a way as to both protect the mechanism from damage and to provide a ramp structure conducive to non-interferring ingress and egress by handicapped passengers.

5 Claims, 7 Drawing Figures

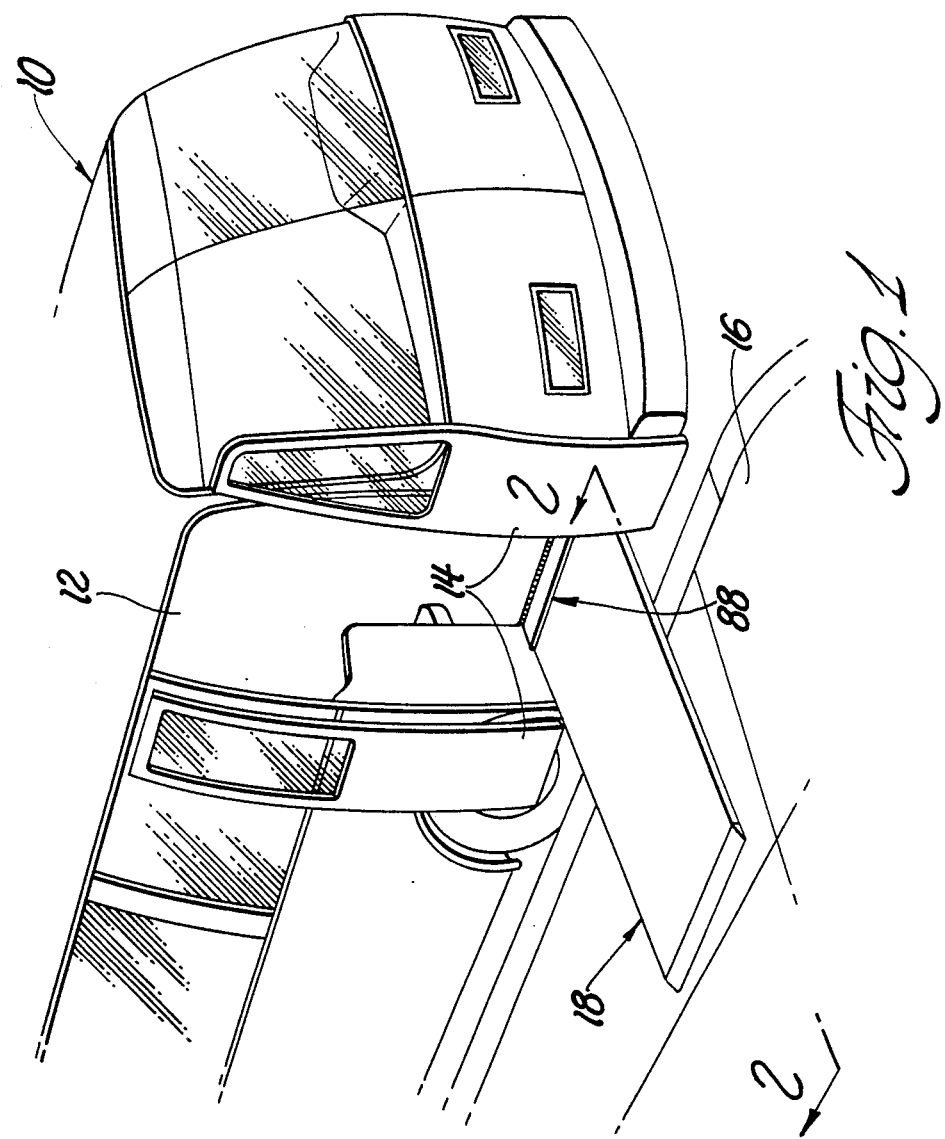

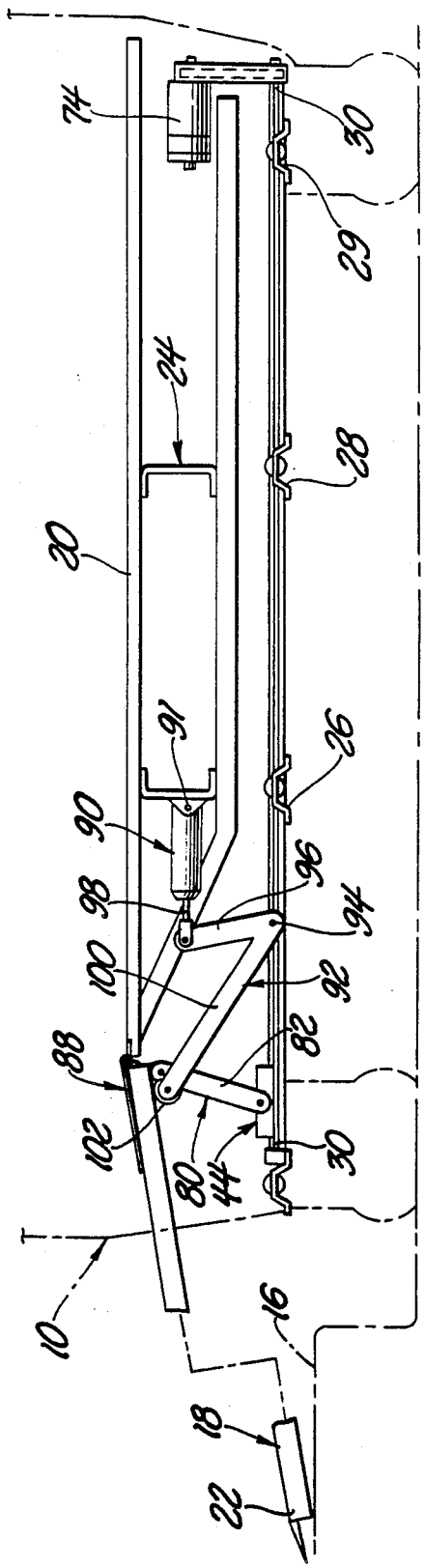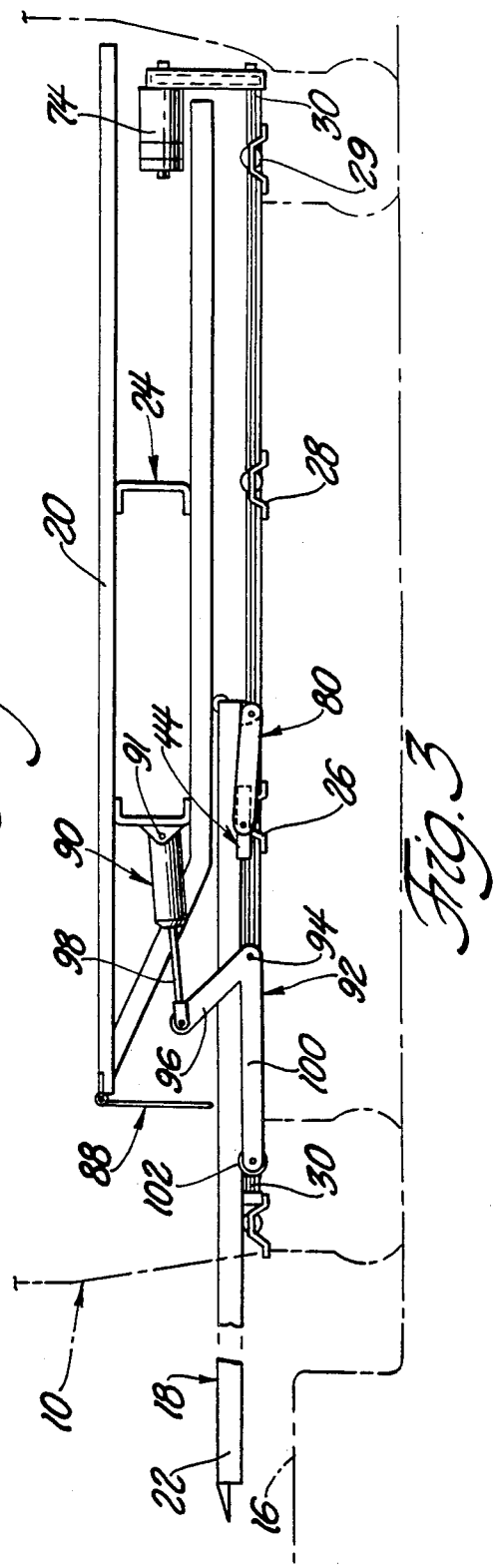

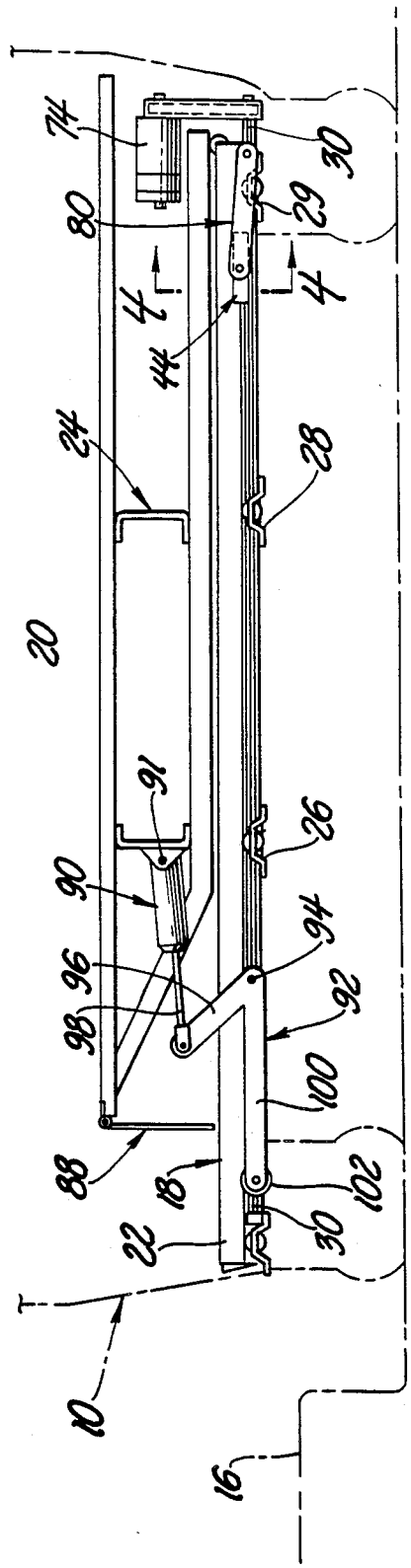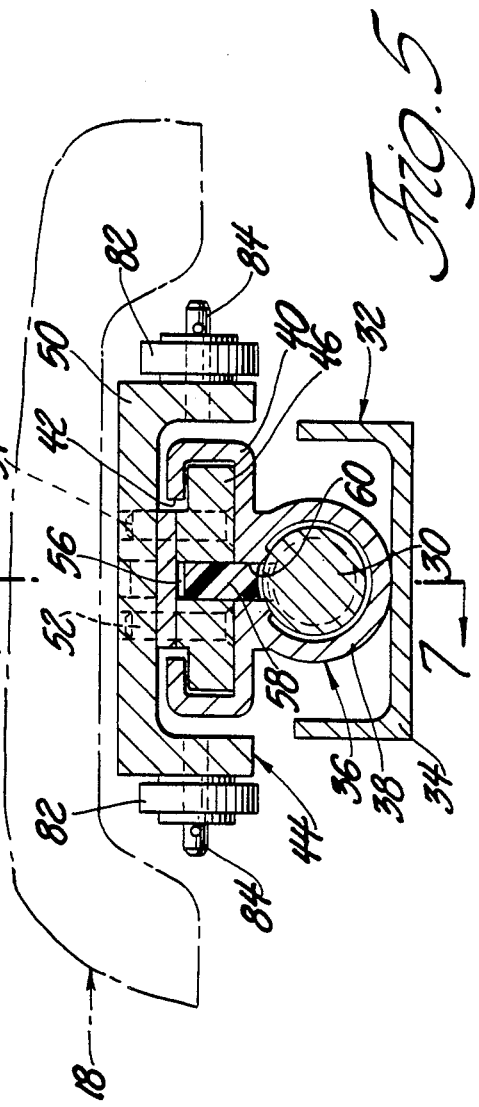

VEHICLE ENTRANCE RAMP

BACKGROUND OF THE INVENTION

The present invention relates to vehicle entranceways and exitways and, particularly, to stowable ramps associated therewith for facilitating the passage therethrough of wheelchairs and persons unable to negotiate one or more steps up into the vehicle.

There has long been a need for an extendible ramp at the entranceway of a motor bus, for example, over which a wheelchair passenger or other handicapped person might traverse in entering or leaving the vehicle at a bus stop. Several years ago, one of the inventors of the subject application was granted U.S. Pat. No. 4,131,209 covering such an extendible ramp device. Even though this earlier device was a distinct improvement over prior art ramps, certain further improvements in this device were necessary and are the subject of the present invention.

In the predecessor patented device, the ramp actuating electric motor and drive screw were incorporated into the ramp structure itself which created several potential problems. First, this increased the mass or weight of the ramp structure and, thus, either required a larger motor than necessary to move the ramp alone or reduced the rate at which the ramp could be extended or retracted relative to the vehicle. Next, being part of the extendible ramp structure subjected both the electric motor and the drive screw to potential damage. Finally, in the earlier design it was necessary to create a hump or a housing in the pivotal riser member to accomodate the motor and which housing could interfere with the passage of a wheelchair or otherwise impede the passage of a handicapped person.

PRIOR ART

The closest prior art device of which we are aware is the already mentioned U.S. Pat. No. 4,131,209 vehicle entrance ramp whose inventor, Donald L. Manning, is one of the inventors of the subject improved device.

The following patents were cited during the prosecution of the earlier Manning patent:

U.S. Pat. No. 1,717,303 —Barclay
U.S. Pat. No. 2,797,104 —Drobney et al
U.S. Pat. No. 3,730,361 —Haynes
U.S. Pat. No. 4,022,337 —Eichenhofer et al
U.S. Pat. No. 4,027,807 —Thorley
U.S. Pat. No. 4,058,228 —Hall With the exception of Manning, none of the prior art references relates to a power actuated ramp. Drobney et al, Eichenhofer and Thorley relate to power actuated steps and the related devices could not be negotiated by a wheelchair or traversed by any person who could not handle one or more steps.

SUMMARY OF THE INVENTION

It is among the principle objects of our invention to provide a power operated ramp to facilitate wheelchair passengers and the like in entering and leaving a vehicle, such as a motor bus; provide such a ramp which is normally stowed below the vehicle floor adjacent an entranceway to the vehicle and, when extended, moves outwardly through the entranceway and automatically tilts upwardly towards its inner end to provide a rigid inclined platform leading to the sidewalk or roadway exteriorly of the vehicle; to provide such a ramp whose extendible end portion is spaced below the vehicle floor to serve as a step for other persons entering the vehicle when the ramp is in its stowed position; to provide such a ramp including a normally vertical step riser in the vehicle entranceway which swings upwardly about the adjacent edge of the vehicle floor to cover the innermost end portion of the ramp when the latter is in its fully extended position; and to provide a ramp actuating mechanism which is separate from the ramp and remains entirely inside the vehicle whereby such mechanism is prevented from being damaged or interfering with the use of the ramp by a handicapped passenger.

The means by which the above-stated objects and advantages of our invention are realized will be clearly understood from the following description of a preferred embodiment thereof selected for the purposes of illustration, having reference to the drawings, wherein:

BRIEF DESCRIPTION OF THE DRAWINGS

FIG. 1 is a perspective view of a motor bus having a side entranceway with our improved ramp in its fully extended position and at rest on a sidewalk.

FIGS. 2, 3 and 4 are transverse views of a bus showing the ramp and associated operating mechanism in a fully extended position, a partially extended position and a fully retracted position.

FIG. 5 is a cross sectional view of the ramp driving mechanism taken along line 5—5 of FIG. 4.

DESCRIPTION OF THE PREFERRED EMBODIMENT

Figure 6:
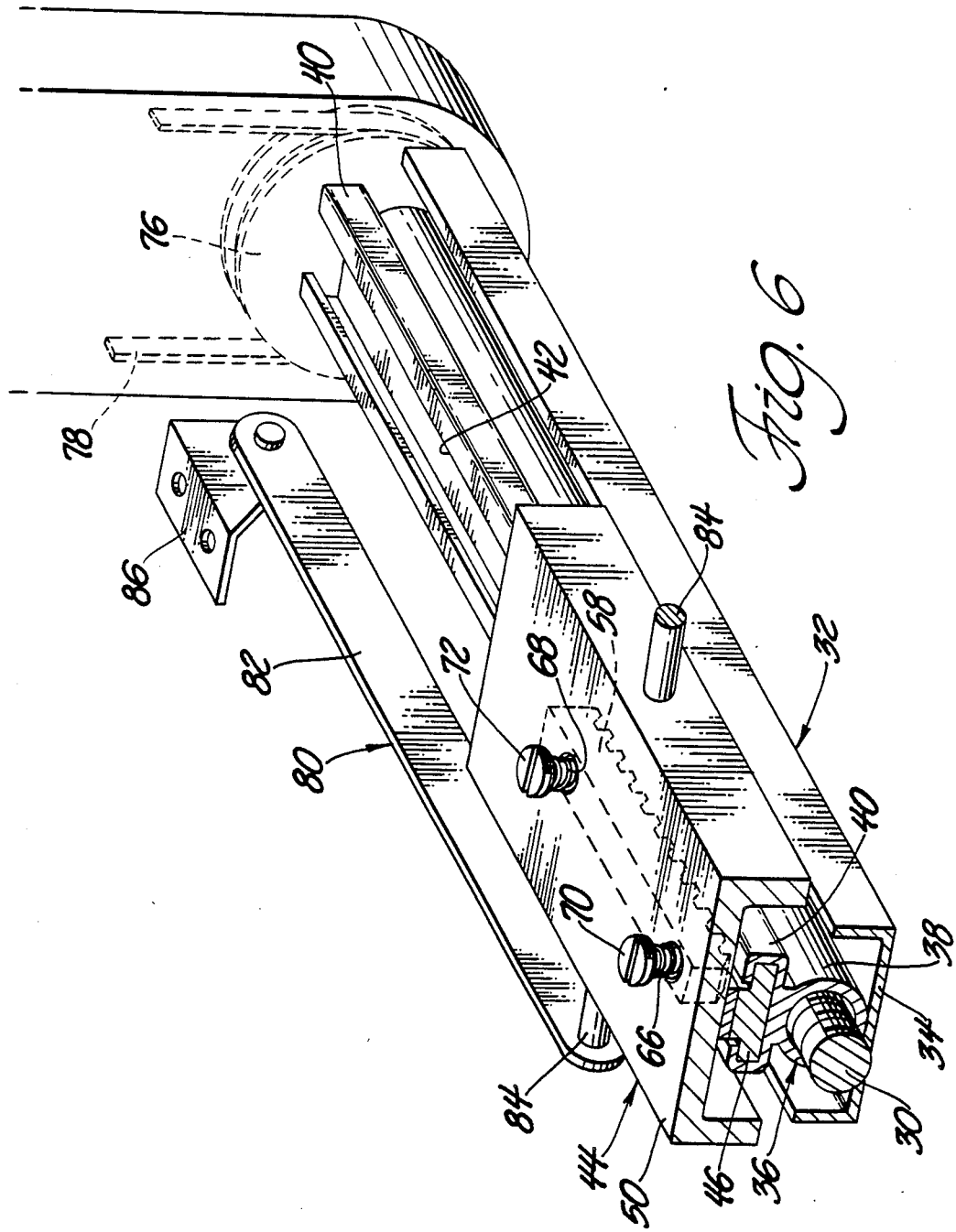
FIG. 6 is a partially sectioned perspective view of the ramp driving mechanism.

As best seen by reference to FIGS. 1 through 4, a motor bus is indicated generally at 10 and includes a front passenger opening 12 generally opposite the driver's position and adapted to be closed by doors 14. In these views the bus is shown parked next to a curb and sidewalk area indicated at 16. An extendible ramp is indicated generally at 18 and is shown in FIGS. 1 and 2 in its fully extended position ready to receive a wheelchair or handicapped person.

Referring specifically to FIG. 4, ramp 18 is shown in its fully retracted position beneath the vehicle floor 20. In this position, the outer most portion 22 of the ramp 18 is disposed within the front door entrance well and forms a step for normal movement into and out of the bus under conditions in which the use of the ramp is unnecessary.

The bus includes a suitable subframe structure indicated generally at 24 which supports the bus flooring and also supports and houses the ramp and its operating mechanism.

Figure 7:
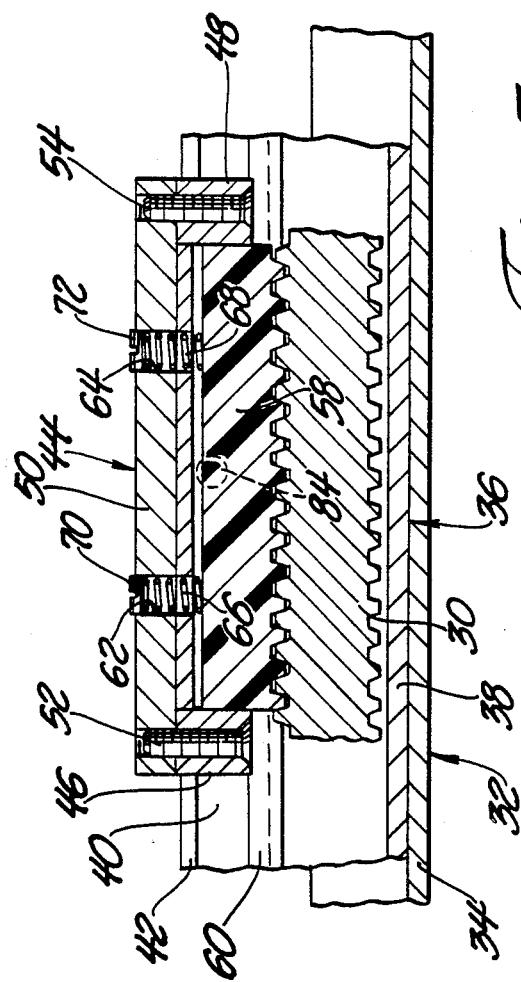
FIG. 7 is a view along line 7—7 of FIG. 5.

The ramp and its operating mechanism will now be described in detail with particular reference to FIGS. 2 through 7. When the ramp is in its fully and partially stored positions beneath the vehicle floor, it is supported adjacent its laterally outer edges upon sets of roller devices 26, 28 and 29 which are, in turn, suitably mounted upon part of the vehicle subframe structure 24. A ramp driving screw is indicated at 30 and is supported for rotation within a housing indicated generally at 32 and which housing is, in turn, fixedly supported to the bus subframe 24. Housing 32 is best seen by reference to FIGS. 5, 6 and 7 and includes an upwardly opening, U-shaped channel 34 to which a drive screw supporting casing 36 is suitably fixed as by welding at its lower portion. The casing 36 includes a tubular portion 38 within which drive screw 30 is rotatably supported. The upper side of casing 36 includes an upwardly opening channel portion 40 having a longitudinally extending slot 42.

A traversing bracket member 44 includes inner guide elements 46 and 48 disposed within said channel portion 40 and slot 42. Bracket 44 includes a downwardly opening U-shaped channel member 50 to the underside of which guide elements 46 and 48 are fixed. Guide elements 46 and 48 are suitably fixed to the U-shaped member 50 through screw members 52 and 54. The T-shaped guide elements 46 and 48 are longitudinally spaced relative to the bracket channel 50 so as to define an intermediate cavity 56 within which a rack member 58 is vertically slidably supported so as to project through a corresponding opening 60 in the tubular member 38 and to engage with the threaded drive screw member 30. In order to prevent damage to the rack member 58 or the drive screw 30 in the event bracket member 44 reaches the end of its travel, the rack member may lift out of engagement with the drive screw. To allow such vertical movement of rack member 58, cavities 62 and 64 are formed through bracket channel 50. Spring elements 66 and 68 are retained within the cavities 62 and 64 by screw caps 70 and 72 and bias rack member 58 downwardly into drivable engagement with drive screw 30. Springs 66 and 68 permit rack member 58 to be moved vertically upwardly out of engagement with drive screw 30 should the screw keep rotating when the bracket member 44 reaches the end of its travel in either direction.

The inner most end of drive screw 30 is drivably connected to an electric motor 74 through a suitable mechanism such as a pulley 76 and a belt 78. When motor 74 is energized to rotate screw 30, rack 58 is driven rearwardly or forwardly carrying with it bracket 44.

The moveable bracket 44 is interconnected with the innermost end of ramp 18 through a linkage mechanism indicated generally at 80. Linkage mechanism 80 includes a pair of levers 82 pivotally connected on either side of the bracket respectively through pin members 84. The other ends of levers 82 are connected through suitable brackets 86 to the innermost end of the ramp 18. As viewed in FIG. 4, as motor 74 is energized to extend ramp 18 to its outer most position, drive screw 30 is rotated and drives bracket 44 to the left and, in so doing, causes the levers 82 to impart a corresponding leftward movement to the ramp.

A step riser is indicated generally at 88 and is hingedly secured to the bus floor 20 adjacent the step well. As the innermost end of ramp 18 approaches riser 88 a suitable switch, not shown, is actuated to energize a power piston or solenoid device indicated at 90 pivotally connected to subframe 24 at 91. A bell crank 92 is pivotally supported at 94 to a portion of the floor substructure 24 and includes a first arm 96 pivotally connected to rod 98 of actuator 90 causing the bell crank to be rotated clockwise when the actuator is energized. The other arm 100 of bell crank 92 includes a roller 102 at its outer end and which roller is adapted to engage ramp 18. As best seen in FIG. 2, when actuator 90 is energized to rotate the bell crank in a clockwise direction, the inner most end of ramp 18 is elevated to bring said end into alignment with the bus floor 20 and, in so doing, also rotates the pivotal riser 88 to provide a smooth transition area between the ramp and the bus floor. When the driver wishes to retract the ramp, actuator 90 is de-energized causing the bell crank lever 92 to move in a counterclockwise direction and lowering the inner end of the ramp to a generally horizontal position after which motor 74 is again energized to move bracket 44 to the right and thereby retract ramp 18 beneath the vehicle floor.

With the aforedescribed arrangement, the ramp 18 is formed of an uninterrupted surface to provide an entirely smooth area for the ingress or egress of wheelchairs or handicapped people. At the same time, the ramp actuating motor and drive screw are disposed beneath the vehicle floor in a protected environment in a way as to minimize damage thereto.

It will be appreciated that various minor changes in the parts or their arrangement may be made without departing from the scope of the inventions as herein after claimed.

What is claimed is:

1. A vehicular passenger boarding system of the type including a door opening (12), a floor (20) within the vehicle, a ramp member (18) storable beneath said floor, a mechanism for moving said ramp laterally of the vehicle so as to extend through the door opening in such a way that the ramp's outer end can rest on the ground, said mechanism including means (90-102) for lifting the inner end of said ramp to the vehicle floor level when the ramp is in its fully laterally extended position whereby a passenger may enter or leave the vehicle by traversing said ramp without the impediment of a step, the improvement in said mechanism comprising:

A. a screw member (30) rotatably mounted in a housing structure (32) supported beneath the vehicle floor and adjacent said ramp, said screw member having
      (1) a first end disposed proximate the inner end of said ramp when the ramp is stored beneath the vehicle floor; and
      (2) a second end terminating proximate the door opening;
   B. motor means (74) secured to said vehicle and drivingly connected to said screw member;
   C. traveller means (44) including a threaded element (58) coacting with the screw member (30) and adapted to move axially relative to the screw member when the latter is rotated;
   D. linkage means (80) pivotally connecting the traveller means (44) and the inner end of the ramp; and
   E. said lifting means (102) adapted to engage the inner end of the ramp and impart an upward movement to rotate the linkage means thereby raising said ramp inner end from said traveller means (44) and positioning said inner end in proximate alignment with the vehicle floor (20) when the ramp is in its fully laterally extended position.

2. A vehicular passenger boarding system as set forth in claim 1 wherein said motor means (74) is drivingly connected to the first end of said screw member (30).

3. A vehicular passenger boarding system as set forth in claim 1 wherein the traveller means (44) includes a bracket (50), said threaded element being slidably supported for vertical movement within said bracket, and means for biasing said element into engagement with the screw member means (62 and 64) whereby said element will move out of driving engagement with the screw member when the traveller means reaches the end of its travel along said screw and said motor continues to operate.

4. A vehicular passenger boarding system as set forth in claim 3 wherein said linkage means (80) includes a pair of levers (82) respectively pivotally connected at one end to said traveller means bracket (50) and at the other end to said ramp (18) proximate the inner end thereof.

5. A vehicular passenger boarding system as set forth in claim 1 wherein said screw member (30) supporting housing structure (32) includes:

A. an upwardly opening U-shaped channel member (34) extending transversely of said vehicle;
B. a screw member supporting casing (36) integrated with and projecting upwardly from said channel member (34), said casing including a guide slot (42) disposed above and extending parallel to the screw member (30);
C. said traveller means (44) including depending elements (46 and 48) extending within and slidably retained by said slot (42).

* * * * *